No. 835,543. PATENTED NOV. 13, 1906.
H. LUTTER & E. A. GIES.
CRANK PLANER.
APPLICATION FILED MAR. 22, 1902.

6 SHEETS—SHEET 1.

No. 835,543. PATENTED NOV. 13, 1906.
H. LUTTER & E. A. GIES.
CRANK PLANER.
APPLICATION FILED MAR. 22, 1902.

6 SHEETS—SHEET 3.

No. 835,543. PATENTED NOV. 13, 1906.
H. LUTTER & E. A. GIES.
CRANK PLANER.
APPLICATION FILED MAR. 22, 1902.

6 SHEETS—SHEET 4.

Witnesses:
Geo. W. Young,
Chas. L. Goss.

Inventors:
Herman Lutter,
Ernst A. Gies,
By Whitaker Flanders Smith Bottum & Kim
Attorneys.

No. 835,543. PATENTED NOV. 13, 1906.
H. LUTTER & E. A. GIES.
CRANK PLANER.
APPLICATION FILED MAR. 22, 1902.

6 SHEETS—SHEET 5.

Witnesses:
Geo W Young
Chas L Goss

Inventors:
Herman Lutter
Ernst A. Gies

No. 835,543. PATENTED NOV. 13, 1906.
H. LUTTER & E. A. GIES.
CRANK PLANER.
APPLICATION FILED MAR. 22, 1902.

6 SHEETS—SHEET 6.

Witnesses:
Geo. W. Young
Chas. L. Goss

Inventors:
Herman Lutter,
Ernst A. Gies,
By Whitaker Flanders Smith Bottum & Co.
Attorneys.

THE NORRIS PETERS CO., WASHINGTON, D. C.

UNITED STATES PATENT OFFICE.

HERMAN LUTTER AND ERNST A. GIES, OF MILWAUKEE, WISCONSIN.

CRANK-PLANER.

No. 835,543.  Specification of Letters Patent.  Patented Nov. 13, 1906.

Application filed March 22, 1902. Serial No. 99,449.

*To all whom it may concern:*

Be it known that we, HERMAN LUTTER and ERNST A. GIES, citizens of the United States, residing at Milwaukee, in the county of Milwaukee and State of Wisconsin, have invented certain new and useful Improvements in Crank-Planers, of which the following is a specification, reference being had to the accompanying drawings, forming a part thereof.

The main objects of this invention are to facilitate the adjustment of the length and position or limits of the stroke of the ram, to change the speed of the ram and in changing from one speed to another to avoid breaking or injuring the driving-gears; to automatically feed the work-supporting table crosswise in relation to the travel of the ram or tool; to provide for vertical adjustment of the table without affecting the adjustment or operation of the cross-feeding connections; to automatically feed the table in either direction crosswise of the path of the tool when the tool is not cutting; to rigidly support the cross-head in different vertical positions, and thereby prevent sagging of the table in front, and generally to improve the construction and operation of this class of machines.

The invention consists in certain novel features of construction and in the arrangement and combinations of parts hereinafter particularly described, and pointed out in the claims.

In the accompanying drawings like letters designate the same parts in the several figures.

Figure 1:
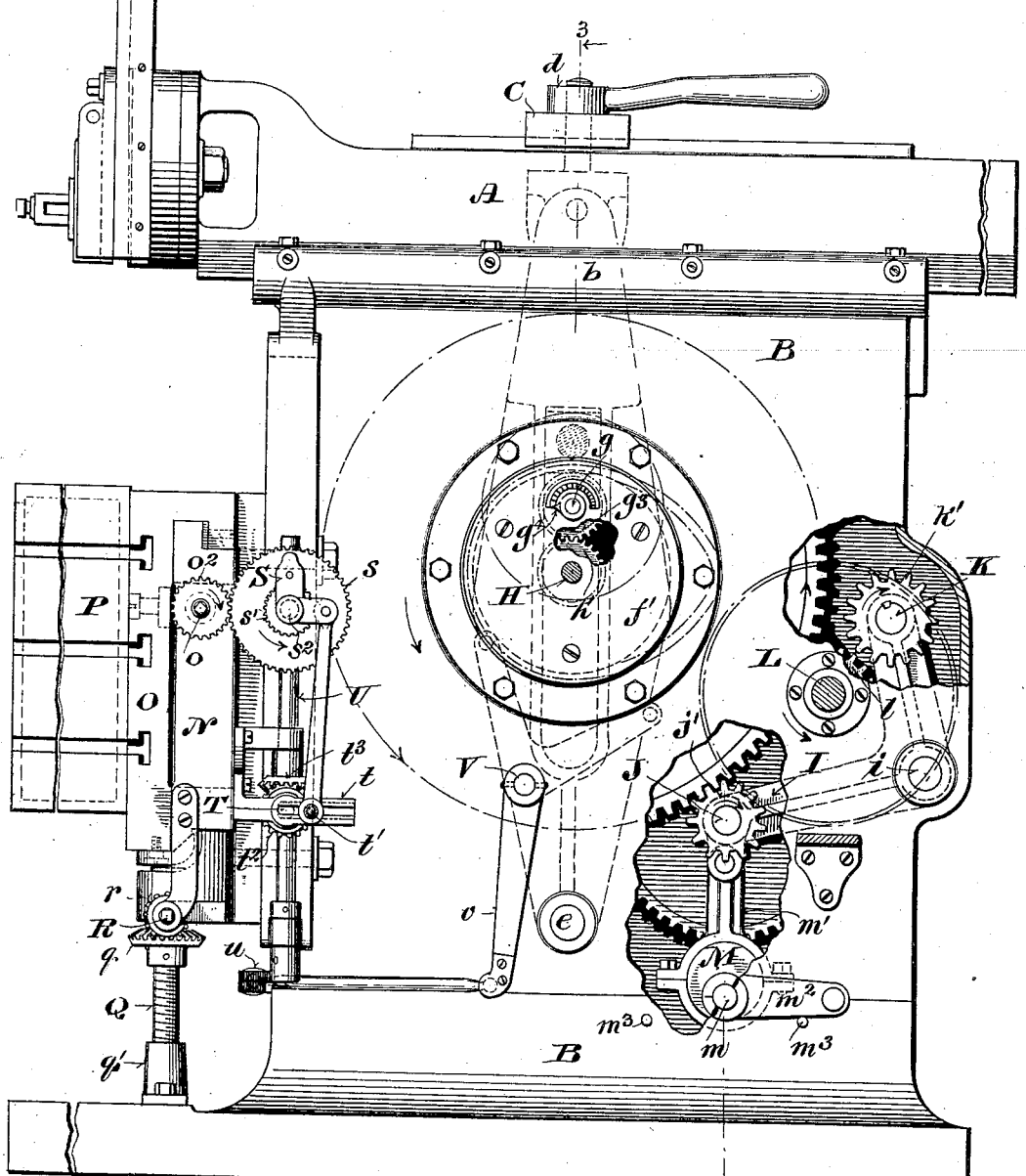
Figure 2:
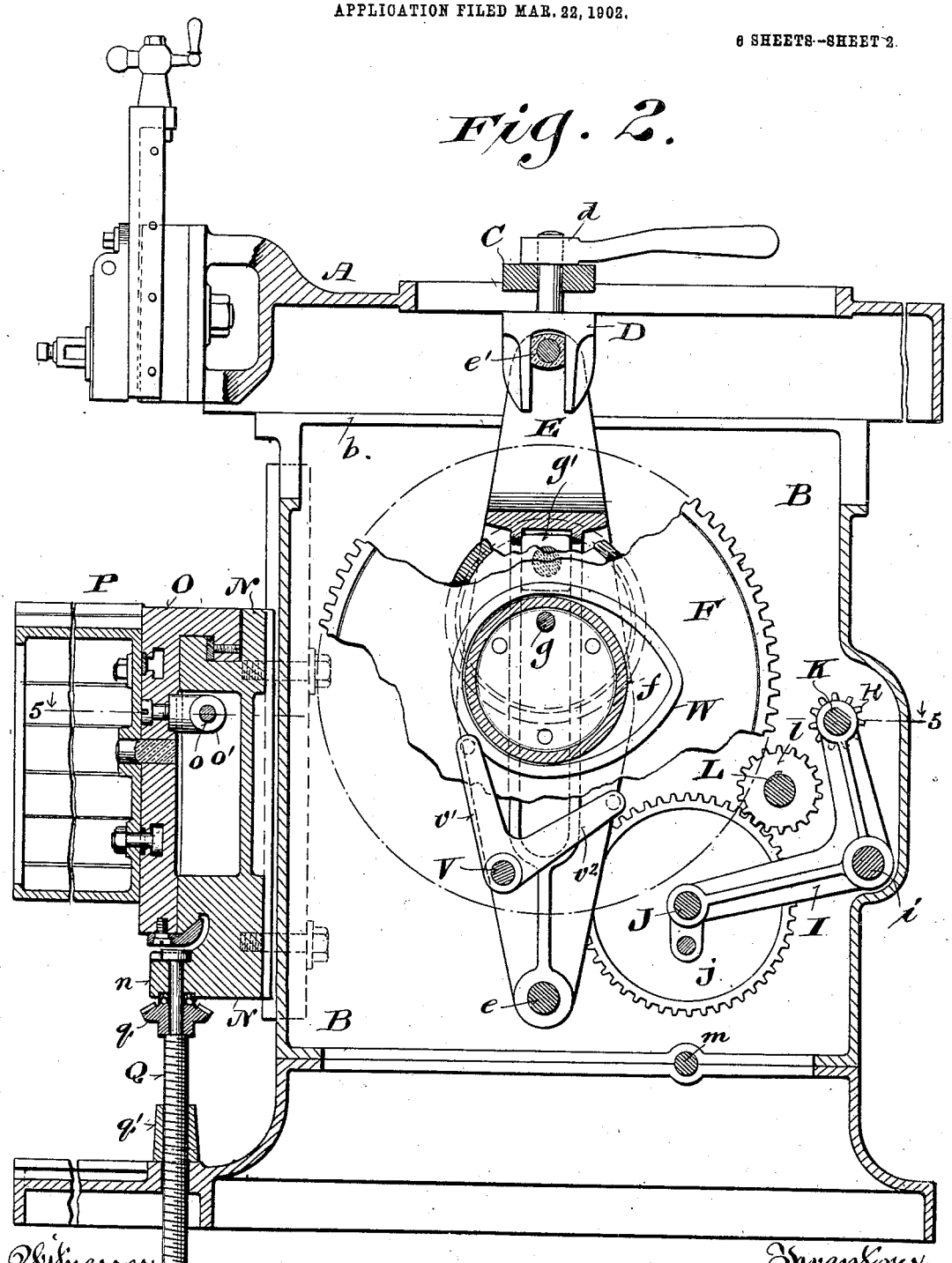
Figure 3:
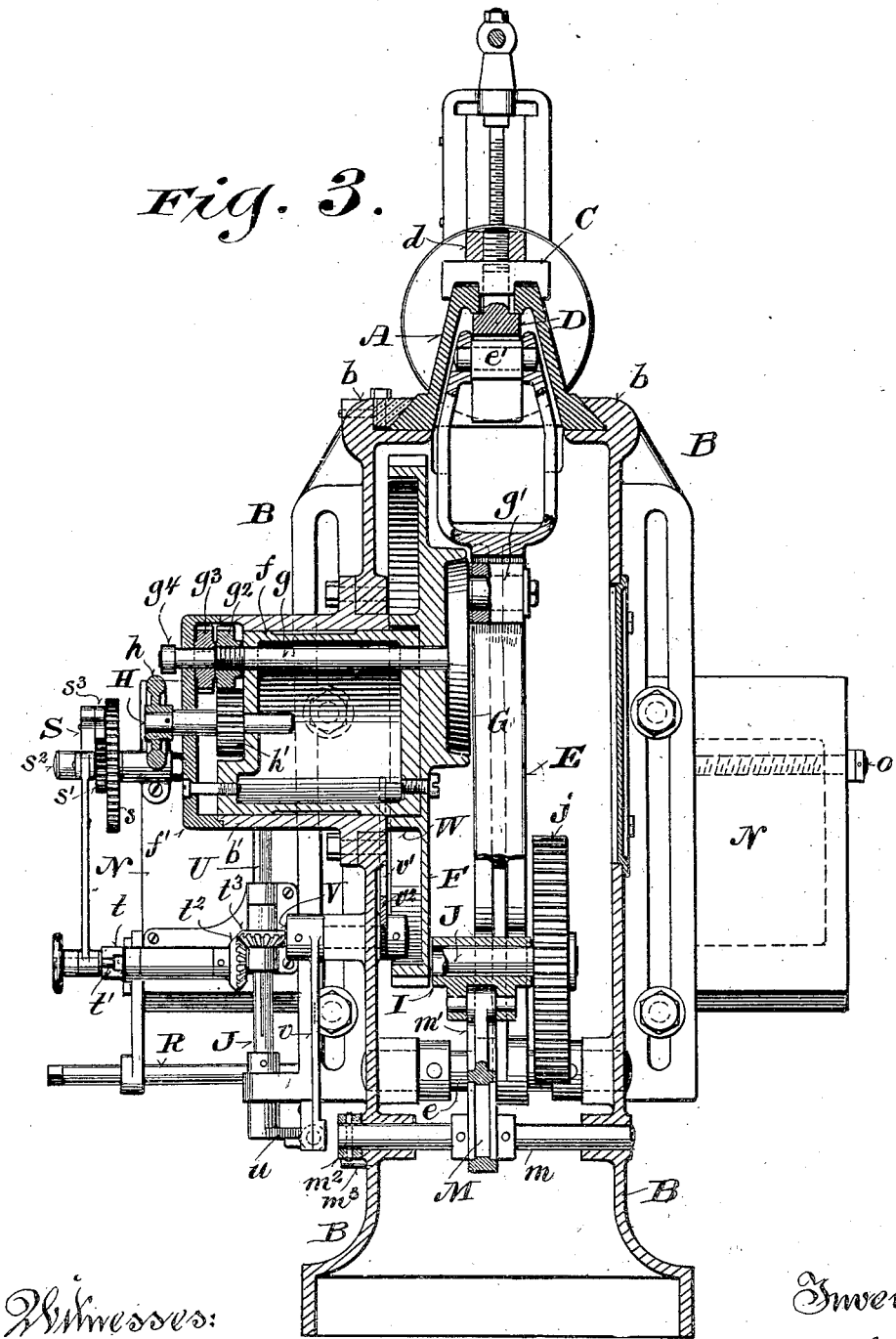
Figure 4:
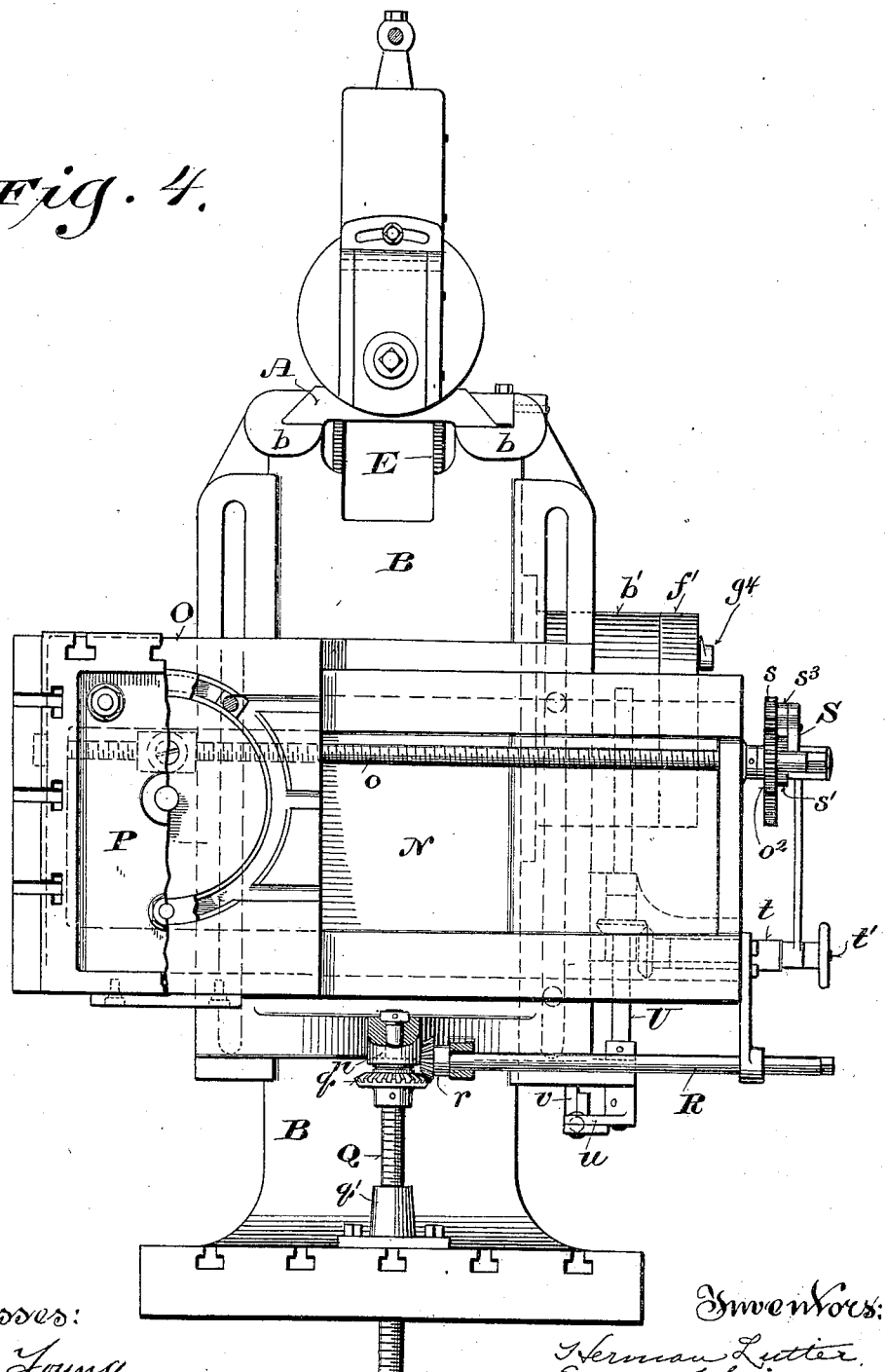
Figure 5:
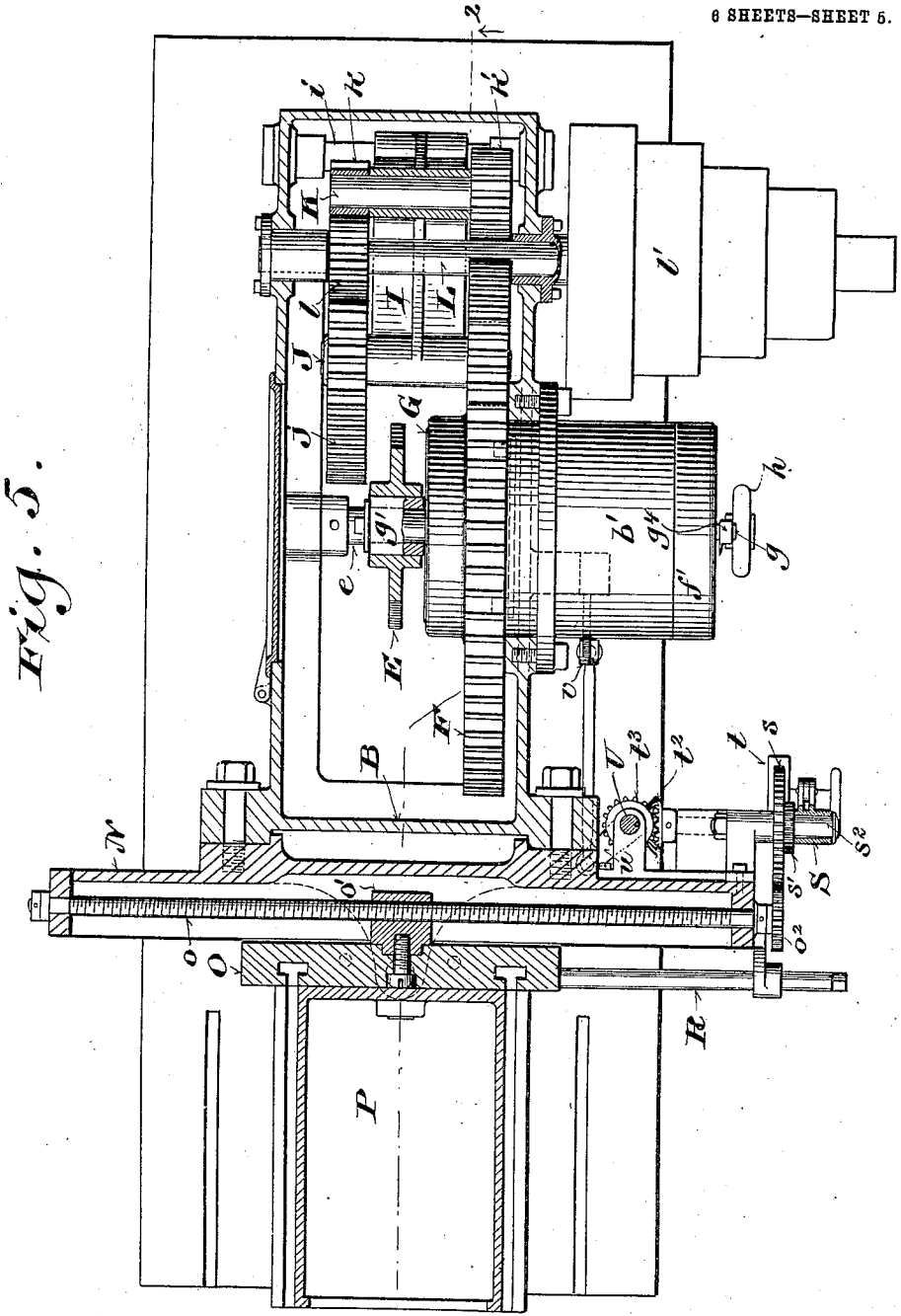

Figure 1 is a side elevation of a machine embodying the invention. Fig. 2 is a vertical longitudinal section of the same on the line 2 2, Fig. 5. Fig. 3 is a vertical cross-section on the line 3 3, Fig. 1. Fig. 4 is a front elevation of the machine. Fig. 5 is a horizontal section on the line 5 5, Fig. 2; and Figs. 6, 7, 8, and 9 are detail views, on an enlarged scale, of parts of the machine, Fig. 8 being a section on the line 8 8, Fig. 6.

Referring to Figs. 1, 2, 3, and 4 of the drawings, A is the ram or reciprocating tool-carriage, fitted to slide horizonatlly in ways $b\ b$, provided therefor at the top of the frame B in the usual or any suitable manner. The ram is provided at the front end with the usual tool supporting and adjusting devices. It is formed with a longitudinal slot through the top, having vertical side walls, and is beveled on the sides.

C is a clamping-plate formed in the under side with parallel grooves, which are fitted to the slotted top of the ram, as shown in Fig. 3.

D is a vertically-slotted pivot-head fitted at the top to the under side of the ram adjacent to the slot therein and having a threaded stem which projects upwardly through the slot in the ram and a hole in the plate C and is provided above said plate with a nut $d$. By loosening this nut the grip of the head D and plate C on the ram are released, and the head may be moved forward or backward in the ram, so as to vary the limits of travel of the tool, as may be desired, with reference to the work on which it is to operate. When adjusted, the pivot-head D is firmly secured to the ram by tightening the nut $d$, which wedges the grooved clamping-plate C upon the beveled sides of the ram. That part of the plate between the grooves abutting against the vertical walls on the sides of the slot in the ram prevents springing of the sides of the ram and contraction of the slot by the wedging action of said plate on the beveled sides of the ram.

E is a vertically-slotted vibrating yoke hinged or pivoted at its lower end to the frame by a cross-shaft $e$ and forked at its upper end and provided with a pivot-pin and block $e'$, which is fitted to slide up and down in the pivot-head D.

F is a gear-wheel, provided on one side with a tubular or hollow journal $f$, which is fitted to turn in a box $b'$ on one side of the frame. On the opposite side adjacent to the yoke E said gear is formed with a circular tapering eccentric-seat in which a beveled friction-disk G is fitted. This disk is provided on one side with a central shaft or stem $g$, which extends through and is adapted to turn in the journal $f$, and on the other side it is provided with a crank-pin and a pivot-block $g'$, which is fitted to work up and down in the slot of yoke E. Two similar gears $g^2$ and $g^3$ are mounted beside each other on the shaft $g$. The gear $g^2$ is threaded on said shaft and adapted to bear against the outer end of the journal $f$, so that when it is screwed up against said journal it will draw the crank-disk G into its seat. The gear $g^3$ is loosely keyed or feathered on said shaft, which is thus allowed to move endwise, but is prevented from turning therein.

H is a short shaft supported parallel with the shaft $g$ and movable endwise in the outer end of the journal $f$ and a cap-plate or cover $f'$, attached thereto. The shaft H is provided with a hand-wheel $h$ or other means for turning it and with a gear $h'$, which meshes normally with the gear-nut $g^2$, and when said shaft is drawn out meshes with the gear $g^3$ also.

The outer end of the shaft $g$ is provided with an index or pointer $g^4$, adjacent to a scale formed, as shown in Fig. 1, on the cap-plate $f'$ to facilitate the adjustment of the crank-disk G and indicate the distance of the crank-pin from the center of the gear F. The cap-plate $f'$ turns with the journal $f$ and serves with the journal-box $b'$ as a cover to protect the aforesaid gears, besides affording a bearing for the outer ends of the shafts $g$ and $h$, which project through it.

By turning the hand-wheel $h$ in one direction when the gear $h'$ meshes with the gear-nut $g^2$ only, as shown in Fig. 3, said gear-nut is screwed outwardly on the shaft $g$, and the crank-disk G is released, so that it will freely turn in its seat. The hand-wheel $h$ being then drawn out, so as to carry the gear $h'$ into engagement with the gear $g^3$, both gears $g^2$ and $g^3$ are turned together by turning said hand-wheel, and the crank-pin is thus carried toward or from the center of the gear-wheel F, the position of the crank-pin with relation to the center of said gear being indicated on the scale by the pointer $g^4$. When the crank-pin is adjusted to the desired position, as above explained, it is locked in that position by thrusting the shaft H inward until the gear $h'$ clears the gear $g^3$, as shown in Fig. 3, and then turning the hand-wheel $h$ in the proper direction to screw the gear-nut $g^2$ up against the end of the journal $f$, and thus draw the crank-disk G tightly into its seat. When the pointer is opposite the left-hand end of the scale, as shown in Fig. 1, the crank-pin will be in the extreme outward position with relation to the center of the gear F, and a reciprocating movement of the greatest extent will be imparted to the ram when the machine is in operation. When the pointer is turned to the zero-point on the scale at the extreme right, the crank-pin will coincide with the axis of the gear F and no movement will be imparted to the ram.

It will be observed that in the adjustment of the crank-pin from one extreme position to the other it is moved through a half-circle and that as it approaches the outer limit of its adjustment the arc in which it travels will approach a perpendicular to a radial line passing through the crank and the center of the gear, so that as the crank-pin is moved outwardly from the center of the gear F in an arc of a circle, whose center is the shaft $g$, it will for any given distance on said arc be moved a gradually-decreasing amount in a radial direction with respect to the center of the gear F. For this reason the scale, as shown in Fig. 1, is graduated to indicate equal degrees of adjustment of the crank-pin in a radial direction with respect to the center of the gear F. In the machine as designed and shown in the drawings the shaft H coincides with the axis of the gear F; but while this is a preferable arrangement it is not essential.

By means of the mechanism hereinbefore described the machine may be easily, quickly, and accurately adjusted to produce any desired length of stroke or traverse of the tool, and the limits of the stroke, whether longer or shorter, may be varied, so that the tool will work nearer to or farther from the frame B, as may be desired.

In this class of machines it is not only desirable to vary the length and position of the stroke of the tool, but also its speed, and for this purpose the change-speed driving-gearing hereinafter described is provided.

I is an angular gear-frame hinged at its elbow within the frame B on a cross-shaft $i$. It is formed or provided at its ends with sleeves or boxes parallel with the shaft $i$, and in the sleeves or boxes shafts J and K are fitted to turn. The shaft J is provided with gears $j$ $j'$, and the shaft K is provided with gears $k$ $k'$. These gears are of different sizes, and the gears $j$ and $k$ are arranged to be engaged with and driven one at a time by a gear $l$ on the driving-shaft L, which is arranged parallel with the shafts J and K and is provided outside of the frame with a cone-pulley $l'$. The gears $j'$ and $k'$ are arranged to be engaged one at a time with and to drive the crank-gear F.

An eccentric M, mounted on a shaft $m$, parallel with the aforesaid gear-shafts, is connected by a strap $m'$ with one arm of the gear-frame I, as shown in Figs. 1 and 3, and to one end of the eccentric-shaft outside of the frame B is fixed a lever $m^2$, by means of which either pair of gears $j$ $j'$ or $k$ $k'$ may be thrown into and held in engagement with the crank-gear F and the driving-gear $l$, while the other pair of gears is carried and held out of engagement therewith. To shift the gear-frame I from one extreme position to another, so as to carry one pair of speed-changing gears out of mesh with the crank and driving-gears and the other pair of speed-changing gears into mesh therewith, the crank or lever $m^2$ and the eccentric M are turned approximately a half-revolution, their extreme positions being determined by stops $m^3$ $m^3$. (Shown in Fig. 1.) When the lever $m^2$ is placed midway between said stops, both pairs of intermediate speed-changing gears will be out of mesh with the gears F and $l$.

By means of the gears above described two changes in the speed of the ram and tool may be effected, and with the cone-pulley having four steps the two changes may be multiplied by four, making altogether eight changes of speed available.

It will be observed that in changing from one speed to another by means of the adjustment of the gear-frame I the intermediate power-transmitting and change-speed gears $j\ j'$ and $k\ k'$ are moved into and out of engagement with the crank-gear F and the driving-gear $l$ in a radial direction, or transversely to their axes, and that before either pair of intermediate gears can be engaged with the gears F and $l$ the other pair of intermediate gears must be disengaged therefrom. By this arrangement not only is the adjustment necessary to change from one speed to another readily effected, but the breaking of the gears incident to moving them endwise into and out of engagement with each other is prevented.

The machine is provided, as usual, on the front side with the cross-head N, apron O, and table P. The cross-head N is bolted to slotted ways on the front side of frame B and is vertically adjustable on said ways. The apron O is fitted to slide horizontally on the cross-head, which is provided on the upper and under sides with suitable ways therefor, and the table P is pivotally attached to the apron, so that the work supported thereon may be adjusted vertically and angularly to the desired level and position and may be moved crosswise to the travel of the tool.

To adjust the cross-head and table vertically and to rigidly support the overhanging table and prevent it from sagging or springing away from the tool, particularly when the machine is operating on heavy work, a vertical screw Q and a crank-shaft R, connected with said screw by bevel-gears $q$ and $r$, are provided. The screw Q has a bearing at its upper end in a forwardly-projecting bracket $n$ on the under side of the cross-head and engages a nut $q'$ on the base of the machine. The shaft R, arranged horizontally in bearings on the under side of the cross-head and squared at its outer end to receive a crank or hand-wheel, moves up and down with the cross-head.

To move the table transversely to the travel of the ram A and to feed the work intermittently in either direction after each forward stroke of the tool, the machine is provided with the automatic adjustable feeding mechanism hereinafter described.

Figure 6:
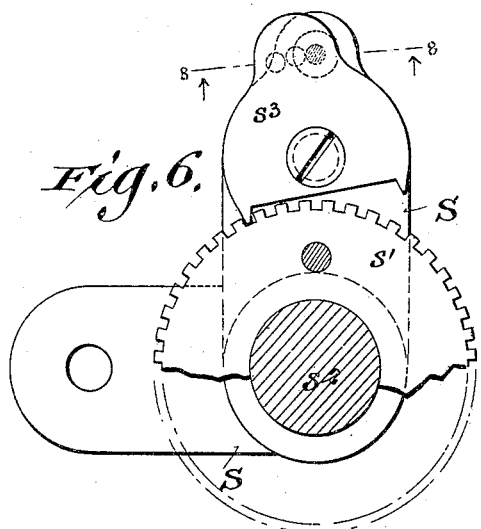
Figure 7:
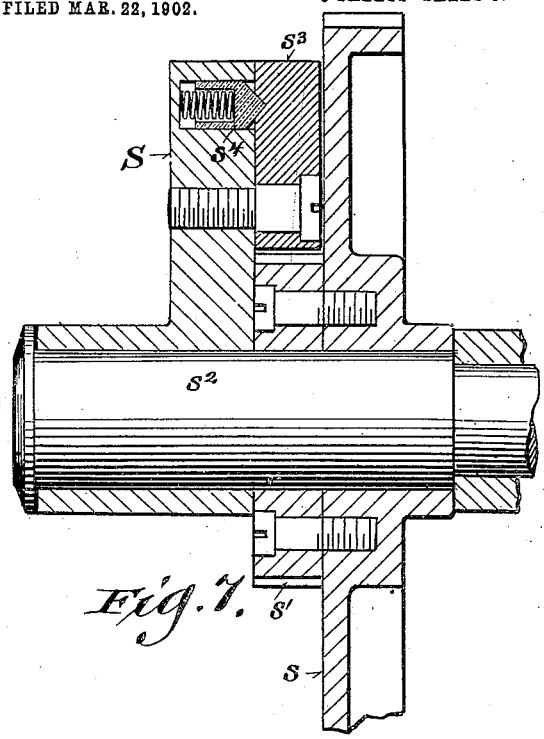
Figure 8:
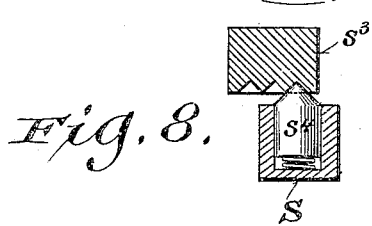
Figure 9:
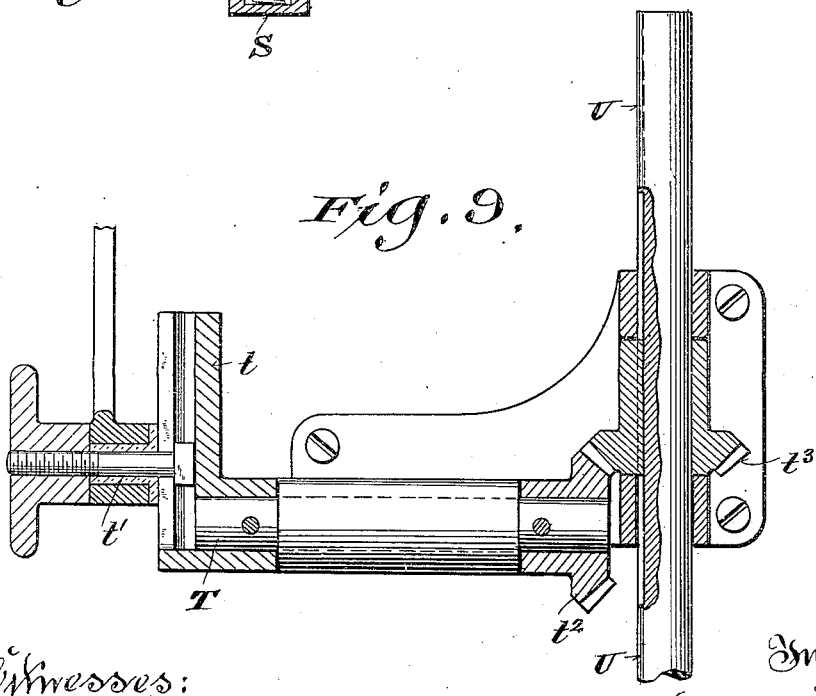

The cross-head N is provided lengthwise thereof with the usual feed-screw $o$, which has bearings therein at the ends and engages a nut $o'$ on the back of the apron. At one end the feed-screw $o$ is provided with a gear $o^2$, which meshes with a larger gear $s$, mounted with a ratchet-wheel $s'$ on a stud $s^2$, carried by a bracket on the cross-head parallel with said screw. Next to the ratchet-wheel $s'$, which is secured to the gear $s$, a vibrating pawl-carrier S, provided with a reversible pawl $s^3$, is mounted on the same stud $s^2$, as shown in detail in Figs. 6 and 7. This pawl-carrier is provided, as shown in Figs. 6, 7, and 8, with a spring-actuated conical or tapering catch $s^4$, which is adapted by engagement with one of a series of three conical seats in the pawl to hold it in position to turn the ratchet-wheel $s'$ in either direction or in a middle position in which it is inoperative. This catch and its seats are so constructed and arranged that when the catch is in engagement with either of the two outer seats the spring acting on their engaging beveled faces will tend to hold the tooth on one side of the pawl in engagement with the ratchet-wheel and will permit said tooth to yield and pass over the teeth of the ratchet-wheel when the pawl-carrier is swung backward. One arm of the angular pawl-carrier S is connected by a rod with a crank-arm $t$, having an adjustable crank-pin $t'$, as shown in Fig. 9, to vary the throw of the pawl-carrier. The arm $t$ is fixed on a rock-shaft T, carried by a bracket on the back of the cross-head parallel with the feed-screw $o$ and provided with a bevel-gear $t^2$, which meshes with a similar gear $t^3$, carried by said bracket and movable therewith up and down on a vertical shaft U, with which it is connected by a spline or feather. The shaft U is provided at its lower end with an arm $u$ and has a fixed bearing on the frame next to said arm. The arm $u$ is connected by a rod with an arm $v$, depending from the outer end of a short horizontal rock-shaft V, which is provided at its inner end, as shown in Figs. 1 and 2, with a bell-crank or two arms $v'$ and $v^2$. The crank-gear F is provided on its back or outer side with a cam W, which has a projection on one side adapted to engage first with an inwardly-projecting friction-roller on the arm $v'$, and then with a similar roller on the arm $v^2$, whereby during a small part of the revolution of the crank-wheel the arm $v$ will be swung backward and forward, the pawl-carrier caused to make a complete vibration, and the feed-screw turned an interval. When the pawl $s^3$ is set to turn the ratchet-wheel $s'$ to the left, as shown in Figs. 1 and 6, the first half of the vibration of said pawl-carrier produced by the engagement of the cam W with the arm $v'$ will turn the feed-screw, while the last half of the vibration of the pawl-carrier produced by the engagement of the cam with the arm $v^2$ will draw the pawl back over the ratchet-wheel without effect thereon. In case the pawl is reversed, so as to turn the ratchet-wheel to the right, the order of the operations last mentioned will be reversed, the first movement of the arm $v$ produced by the cam W carrying the pawl forward over the ratchet-wheel without effect thereon and the next movement of said arm turning the ratchet-wheel and feed-screw. As both the backward and forward movement of the arm $v$ are effected by the cam W in considerably less than half a revolution of the crank-wheel, the cam is arranged with relation to the crank-pin which engages the ram, so that in whichever direction the table and work are moved the feed will take place during the backward stroke of the tool while it is not working. This is an important feature of the machine, since it is for obvious reasons objectionable to feed the work while the tool is making a cut.

With the feed mechanism herein shown and described the cross-head and table are adjusted vertically without attention to or effect upon the actuating connections of the feed-screw, which adapt themselves to any change in the vertical adjustment of the cross-head, the gear $t^3$ moving freely up and down on the shaft U.

Various changes in the details of the machine may be made within the spirit and intended scope of the invention.

We claim—

1. In a crank-planer the combination with a reciprocating ram, of a crank-wheel for operating said ram, a crank-pin connected with said ram and mounted eccentrically upon a shaft which is revolubly fitted in said crank-wheel eccentric thereto and parallel with its axis, a gear-nut threaded on said shaft for locking said crank-pin with relation to said wheel, a similar gear mounted on and adapted to turn said shaft for adjusting the crank-pin toward and from the center of said crank-wheel, and an operating-gear adapted to mesh with and to turn said gear-nut and movable into and out of mesh with the other gear, substantially as described.

2. In a crank-planer the combination with a reciprocating ram, of a crank-wheel having a journal on one side and an eccentric beveled seat on the other, a beveled friction-disk fitted to said seat and provided on one side with a crank-pin for actuating said ram and on the other side with a shaft extending through said journal eccentric thereto and capable of rotary and endwise adjustment therein, a gear-nut threaded on the outer end of said shaft next to the outer end of said journal, a similar gear splined on said shaft adjacent to said gear-nut, and a gear carried by said journal in position to mesh with said gear-nut and movable into and out of mesh with the other gear, substantially as described.

3. In a crank-planer the combination with a reciprocating ram, of a crank-wheel provided on one side with a journal and on the other side with a seat, a friction-disk fitted to said seat and provided on one side with a crank-pin for actuating said ram and on the other side with a shaft extending through said journal parallel with its axis and capable of rotary and endwise adjustment therein, a gear-nut threaded on said shaft for clamping said disk against its seat, a similar gear mounted on said shaft, an operating-shaft revoluble and movable endwise in said journal coaxially therewith and provided at its outer end with turning means, and a gear mounted on said operating-shaft in position to mesh with said gear-nut and movable into and out of engagement with the other gear, substantially as described.

4. In a crank-planer the combination with the ram, of a crank-wheel having a journal on one side and an eccentrically-disposed seat on the other, a friction-disk fitted to said seat and provided with a crank-pin for actuating said ram and with a shaft movable endwise in said journal parallel with its axis, a gear-nut threaded on said shaft, a similar gear mounted and held against turning on said shaft, a shaft carried by said journal parallel with the first-mentioned shaft and provided with a gear which is adapted to mesh with said gear-nut and is movable into and out of mesh with the other gear, and a cover attached to said journal and inclosing said gears, said shafts projecting through said cover and being provided one with an index and the other with turning means, substantially as described.

5. In a crank-planer the combination of a longitudinally-slotted ram having beveled sides, a clamping-plate having opposing parallel faces beveled to fit over and to engage with the beveled sides of the ram, a pivot-head fitted to the under side of the ram and having a threaded stem which projects upwardly through the slot in the ram and a hole in said plate and is provided above said plate with a clamping-nut, and an actuating-crank connected with said head, substantially as described.

6. In a crank-planer the combination of a longitudinally and vertically slotted ram having beveled sides and vertical walls at the sides of the slot, a clamping-plate having parallel grooves fitting the beveled sides and the vertical walls of the ram, a pivot-head fitted to the under side of the ram and having a threaded stem passing upwardly through it and the clamping-plate and provided above said plate with a nut, and an actuating-crank connected with said head, substantially as described.

7. In a crank-planer the combination of a reciprocating ram, a crank-wheel for operating the same, a vertically-adjustable cross-head, a table movable on said cross-head transversely to the travel of the ram, a feed-screw carried by said cross-head and engaging a nut on said table, a pawl and ratchet-wheel carried by the cross-head for turning said feed-screw, a horizontal rock-shaft carried by the cross-head and having a crank connected with said pawl, a vertical shaft having a stationary bearing and connected with said rock-shaft by bevel-gears which are carried by said cross-head and one of which is movable up and down on said vertical shaft, a cam connected with said crank-wheel and a lever operated by said cam and connected with a crank-arm on said vertical shaft, substantially as described.

In witness whereof we hereto affix our signatures in presence of two witnesses.

HERMAN LUTTER.
ERNST A. GIES.

Witnesses:
 CHAS. L. GOSS,
 ALICE E. GOSS.